3,489,772
SULFONIUM SALTS AND PROCESS OF
PREPARATION THEREOF
Sheldon B. Greenbaum, Tonawanda, N.Y., assignor to
Hooker Chemical Corporation, Niagara Falls, N.Y., a
corporation of New York
No Drawing. Filed Nov. 30, 1965, Ser. No. 510,664
Int. Cl. C07c *161/00;* C07d *75/00*
U.S. Cl. 260—327                                       11 Claims

ABSTRACT OF THE DISCLOSURE

A compound of the formula:

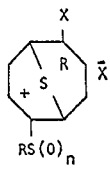

wherein: (a) X is halogen; (b) $n$ is from 0 to 2; (c) R is selected from the group consisting of: (1) alkyl of 1 to 20 carbon atoms, (2) aryl of 6 to 18 carbon atoms, (3) substituted alkyl of from 1 to 30 carbon atoms wherein the substituent(s) is selected from the group consisting of: fluorine, chlorine, bromine, iodine, aryl of 6 to about 18 carbon atoms, and substituted aryl wherein the substituent(s) on said aryl is selected from the group consisting of: fluorine, chlorine, bromine, iodine, alkyl of 1 to 20 carbon atoms, and substituted alkyl of 1 to 30 carbon atoms as hereinbefore described; and (4) substituted aryl of 6 to 30 carbon atoms wherein the substituent(s) on said substituted aryl are as hereinbefore described.

The present invention is concerned with novel sulfonium salts and processes of preparation thereof. More specifically, the present invention is directed to the sulfonium salts of 9-thiabicyclo [3.3.1] nonane which are prepared from a cyclooctadiene.

In accordance with the present invention there are provided novel compounds of the following formula:

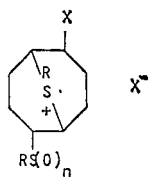

wherein R is a radical selected from the group consisting of alkyl, aryl, substituted alkyl, and substituted aryl, X is a halogen atom and $n$ is from 0 to 2.

Among the R radicals encompassed herein are alkyl of from 1 to about 20 carbon atoms, and preferably of from 1 to about 12 carbon atoms, such as methyl, ethyl, propyl, butyl, amyl, octyl, decyl, dodecyl pentadecyl, eicosyl, as well as their various isomer forms such as isopropyl and isobutyl, said alkyl radical being a monovalent radical derivable from an aliphatic hydrocarbon alkane by removal of one hydrogen atom; substituted alkyl of from 1 to about 30 carbon atoms and preferably of from 1 to about 15 carbon atoms, said alkyl group being substituted by one or more of halogen, aryl, substituted aryl, and the like. The designation "aryl" or "AR" represents an aromatic structure containing from 6 to about 18 carbon atoms, and preferably 6 to about 10 carbon atoms, such as benzene, naphthalene, anthracene, and the like. The aryl radical can be substituted by alkyl and substituted alkyl as defined herein. The halogen atom can be chlorine, bromine, fluorine or iodine and mixtures thereof.

Illustrative examples of the novel compounds being embraced within the scope of the present invention are as follows:

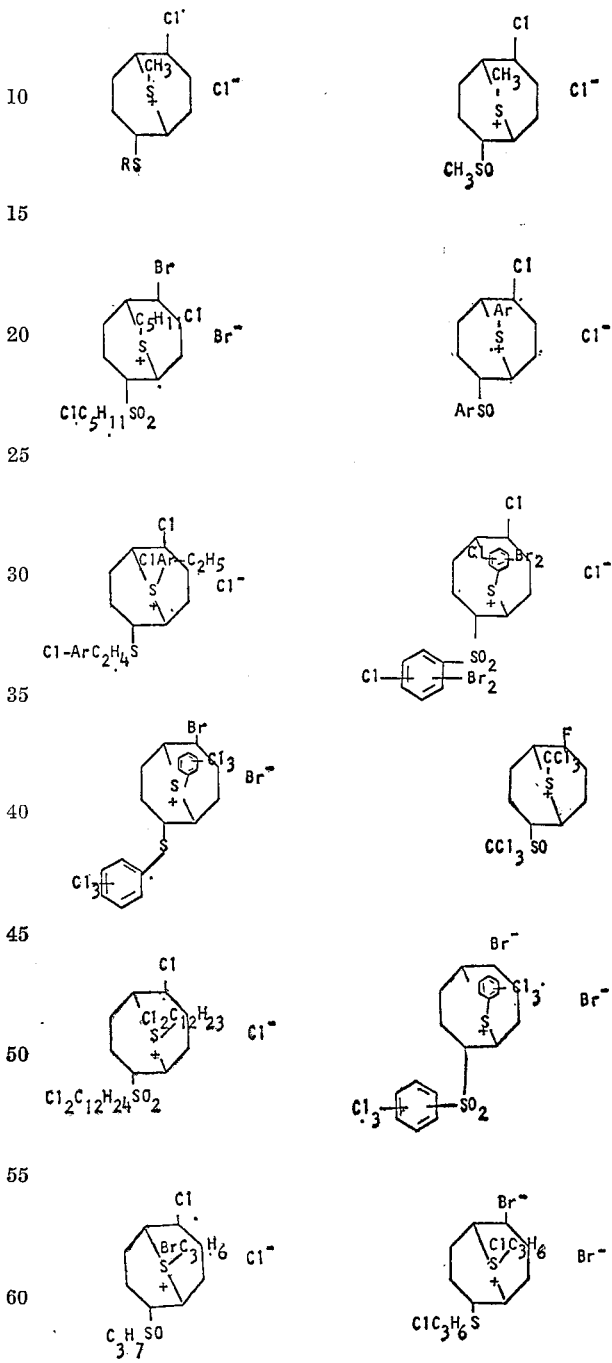

The compounds of this invention when $n$ is zero are prepared by a novel ring bridging transannular reaction wherein a sulfenyl halide is reacted with a cyloocetadiene, such as 1,5-cyloocetadiene. In a preferred embodiment, the process of the present invention comprises the reaction of a 1,5-cyclooctadiene with a sulfenyl halide of the formula RSX wherein the substituents F and X are as defined herein.

In reacting a diene such as 1,5-cyclooctadiene with a sulfenyl halide such as methane sulfenyl chloride, one would expect to obtain the compound as represented by the structure:

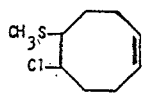

if a 1:1 molar ratio of sulfenyl halide to diene is used, or compounds as represented by the structures

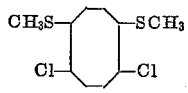

and

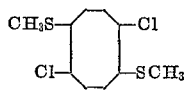

if a 2:1 molar ratio of sulfenyl halide to diene is used. Thus, it was surprising to discover that a transannular reaction occurred instead, giving rise to the compounds of the present invention, wherein $n$ is zero.

With regard to the reaction conditions, they can vary over wide ranges and depend generally on the reactants employed and the yields desired. Generally, the temperature employed ranges from about −60 degrees centigrade to about 60 degrees centigrade, and is preferably from −20 degrees centigrade to 0 degrees centigrade. Normally, approximately 2 moles of the sulfenyl halide are employed per mole of cyclooctadiene utilized. However, greater and lesser amounts can be used, if desired, but they may have adverse affects on the reaction conditions and may lower the yield of desired product. It is, of course, appreciated that reaction conditions outside of those described therein can be employed provided that they do not adversely affect the reaction conditions.

The time employed to effect the reaction can also vary over wide ranges and will depend upon the reactants utilized and the yield desired. Generally the time ranges from about 5 hours to 50 hours, and preferably is from about 5 hours to 24 hours.

The compounds of the present invention when $n$ is 1 or 2 are prepared by the oxidation of the corresponding salts of the formula:

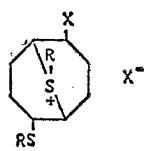

wherein R and X are as defined herein.

The reaction is effected under oxidizing conditions, that is, an oxidizing agent is employed which acts as a source of oxygen. Suitable oxidizing agents include, for example, inorganic and organic peroxides such as hydrogen peroxide, acetyl peroxide, peracetic acid, performic acid, perbenzoic acid, perphthalic acid, or other peroxy organic acids, nitric acid, nitrogen dioxide or tetroxide, permanganates, chromic acid or dichromates, bromic acid or bromates, hypochlorous acid, ozone, molecular oxygen and the like.

The temperature employed in effecting this reaction ranges from about −25 degrees centigrade to 100 degrees centigrade, and preferably is from 0 to about 50 degrees centigrade. It is, of course, appreciated that other temperatures can be employed, for example, higher temperatures than 100 degrees centigrade and lower temperatures than −25 degrees centigrade. However, the yield may be adversely affected under such conditions.

With respect to the other reaction conditions, about 2 equivalents of oxidizing agent to 1 mole of sulfonium salt are employed when it is desired to introduce 1 oxygen atom, or 4 equivalents of oxidizing agent to 1 mole of sulfonium salt are used when it is desired to introduce 2 oxygen atoms, thus forming the $-SO_2$ group. Greater and lesser amounts of oxidizing agent can be used in the practice of the present invention such as up to about 5 moles of oxidizing agent or less than 0.5 mole of oxidizing agent per mole of sulfide. An equivalent is the amount of material necessary to transfer 1 charge or electron.

In both reactions described above, when $n$ is from 0 to 3, solvents can be employed if desired to facilitate the reaction, such as organic and inorganic solvents like organic acids, water, dioxane, glycols, i.e. alkylene glycols, ethers, i.e. dialkylethers, tetrahydrofuran and the like. Specific examples of solvents include benzoic acid, ethylene glycol, propylene glycol, dimethylether, diethylether and the like. The desired product is separated from the reaction medium by one of a number of known methods such as fractional crystallization, distillation, extraction, filtration, gas chromatography, and the like.

Among the reactants utilized in the process of the present invention are the following:

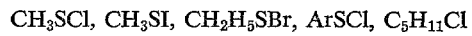

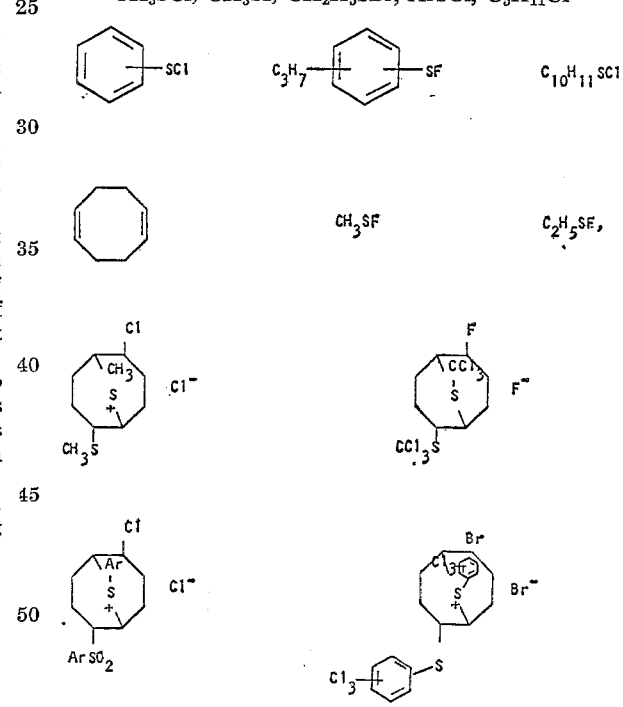

Additionally, all the compounds as listed in col. 2, lines 6–62 of this application can be employed as reactants when preparing those compounds where $n$ is 1 or 2.

The compounds of the present invention have utility as chemical intermediates, as pesticides and as fungicides. Additionally, the compounds of the present invention exhibit activity on microorganisms such as fungi, bacteria, and in some instances nematodes.

In general, when the compounds of the present invention are employed as pesticides, they will be applied in rates ranging from between about 0.1 pound per acre up to several hundred pounds per acre, e.g., 200 pounds per acre, the amount depending on crop sensitivity, weather conditions and other factors known to those skilled in the art.

While the compounds of the present invention may be utilized as pesticides in the pure form, they may be conveniently employed in the form of formulations which in some instances tend to enhance the pesticidal activity. Suitable formulations include solutions of the pesticide compound in a solvent such as a petroleum hydrocarbon, for example, xylene, heavy aromatic naphthas, and the like, and aqueous dispersions or emulsions generally contain surface active agents such as those listed in "Soap and Chemical Specialties," volume 31, No. 7, pages 50–61, No. 8, pages 48–61, No. 9, pages 52–69, and No. 10, pages 38–67 (1955). Also useful are solid formulations of the compounds of the present invention wherein solid carriers such as talc, silica, vermiculite and clay may be employed. Of course, the solid formulations may also contain surface active agents, sticking agents, stabilizing agents, or binders, to facilitate their application.

Additionally, the compounds of the present invention can be formulated with other pesticides as for example, other fungicides such as sulfur, the fungicidal dithiocarbamates, nitropolyfluorobenzenes and various other fungicidal compounds having chlorinated ultrathio groups such as captan. Further, the compounds of this invention may be formulated with synergists serving to enhance the pesticidal activity, such as, for example, piperonyl butoxide and the like.

Specifically, the reaction sequence for the preparation of a phosphorus insecticide is illustrated by the following equations:

I

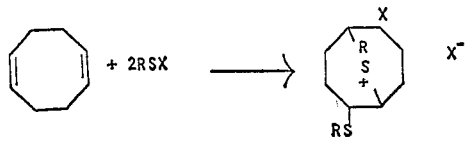

II

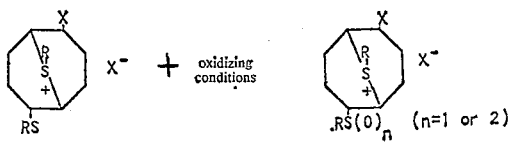

III

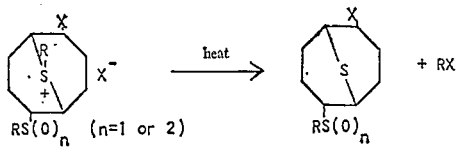

IV

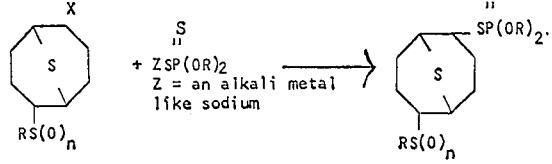

The product as produced in Equation IV is useful as an insecticide.

The sulfonium salts described herein possess useful properties as intermediates. For example, heating the sulfonium salt causes an evolution of the alkyl or aryl halide and this process affords compounds that would be difficult to obtain in other ways. Secondly, the sulfonium derivatives herein described are uniquely constructed to protect the transannular sulfur atom from oxidation, while permitting oxidation of other elements attached to the ring. These oxidation products can be further reacted to form other useful products, such as phosphate esters.

In the examples, specification and claims the term "parts" indicate parts by weight unless otherwise specified while all temperatures are given in degrees centigrade unless otherwise stated.

The following examples are given for purposes of illustration and are not to be understood as limiting as obvious modifications will occur to those skilled in the art.

EXAMPLE 1

2-chloro-6-methylmercapto-9-methylthiabicyclo [3.3.1]nonanium chloride

A mixture of 94 grams (1 mole) of dimethyl disulfide and 300 milliliters of carbon tetrachloride was cooled to —20 degrees centigrade and then treated with 71 grams (1 mole) of chlorine gas at a maximum temperature of —10 degrees centigrade. This was added to a mixture of 108 grams (1.0 mole) of 1,5-cyclooctadiene and 150 milliliters of carbon tetrachloride with stirring over a period of 3 hours. After warming to room temperature, about 25 degrees centigrade, the mixture was allowed to stand overnight. The precipitate was removed and dissolved in methanol. The addition of acetone gave a white crystalline product. The product melted at 184–185 degrees centigrade.

*Analysis.*—Calculated for $C_{10}H_{18}Cl_2S_2$: Cl (total), 26.1%; Cl (ionic), 13.0%; S, 23.4%. Found: Cl (total), 25.8%; Cl (Volhard), 12.7%.

EXAMPLE 2

Preparation of 2-chloro-6-phenylmercapto-9-phenylthiabicyclo[3.3.1]nonanium chloride A flask protected from light was charged with 1 liter of carbon tetrachloride and cooled to —15 degrees centigrade. 44 grams of thiophenol diluted to 125 milliliters with carbon tetrachloride was added dropwise to the reaction flask simultaneously with the addition of 30 grams of gaseous chlorine. When the addition was complete the solution was purged with nitrogen and allowed to stand at room temperature for 3 hours. A sample was removed and titration indicated formation of 83.1 percent of ether and the theoretical yield of benzenesulfenyl chloride.

A solution of 43.2 grams of 1,5-cyclooctadiene in 50 milliliters of carbon tetrachloride was added to the solution of phenyl sulfenyl chloride in carbon tetrachloride described above, maintaining the temperature below 4 degrees centigrade. After an overnight period of standing, crystals appeared which were filtered off and dried. Several recrystallizations from methanol and acetone yielded the desired crystalline product, melting at 145–147 degrees centigrade.

*Analysis.*—Calculated for $C_{20}H_{22}Cl_2S_2$: Cl, 17.9%; S, 16.1%; Found: Cl, 17.9%; S, 16.1%.

In a manner similar to Examples 1 and 2, utilizing the reaction conditions and procedures of those examples with corresponding reactants, the following compounds are prepared.

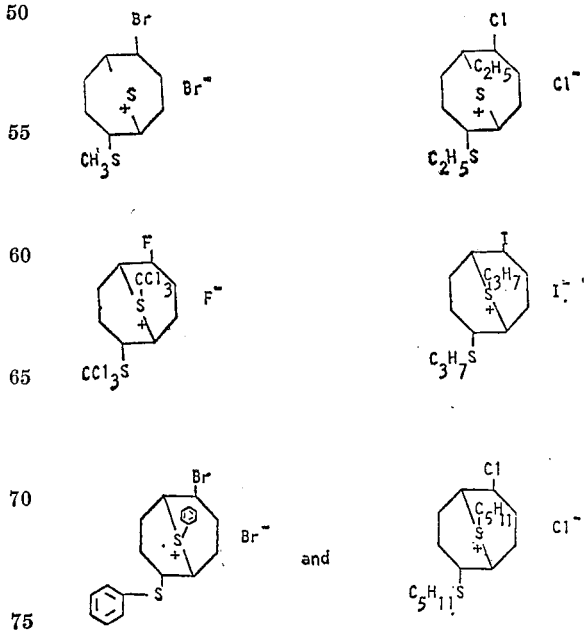

EXAMPLE 3

Oxidation of 2-chloro-6-methylmercapto-9-methylthiabicyclononanium chloride to the 8-methyl sulfoxide derivative 13.7 grams of 2-chloro-6-methylmercapto-9-methylthiabicyclononanium chloride was dissolved in 75 milliliters of glacial acetic acid. To this was added 6.5 milliliters of 30 percent hydrogen peroxide in a dropwise manner. After part of the peroxide had been added, the temperature increased to 50 degrees centigrade. The mixture was then chilled and the remainder of the 6.5 milliliters of the peroxide was added. After an additional half hour the solution was diluted with one liter of acetone. The resultant white crystalline precipitate melted at 160 degrees centigrade. Infrared analysis demonstrated the presence of an S→O bond.

*Analysis.*—Calculated for $C_{10}H_{18}Cl_2OS_2$: Cl (total), 24.6%; Cl (ionic), 12.3%; S, 22.1%. Found: Cl (total), 24.3%; Cl (ionic), 11.6%; S, 22.4%.

EXAMPLE 4

2-chloro-6-methylsulfonyl-9-methylthiabicyclo 3.3.1-nonanium chloride

A solution of 84 grams of the sulfoxide product as prepared in Example 1 was dissolved in 170 milliliters of formic acid and cooled to ice bath temperatures, about 0 degrees centigrade. The solution was then treated dropwise with 31 milliliters of 30 percent hydrogen peroxide. The solution was allowed to stand overnight and gradually returned to room temperature, about 25 degrees centigrade, at which time the solvent was removed at the aspirator. The residue was diluted with 1200 milliliters of acetone and the crystalline sulfone was removed and washed with acetone. Recrystallization from methanol afforded 45 grams of product, melting point 153–154 degrees centigrade.

*Analysis.*—Calculated for $C_{10}H_{18}Cl_2O_2S_2$: Cl (ionic 11.6), 23.2%; S, 21%. Found: Cl (ionic 11.4), 22.8%; S, 20.8%.

In a manner similar to Examples 3 and 4, that is utilizing the reaction conditions and procedures of these examples, and corresponding reactants, the following compounds are prepared.

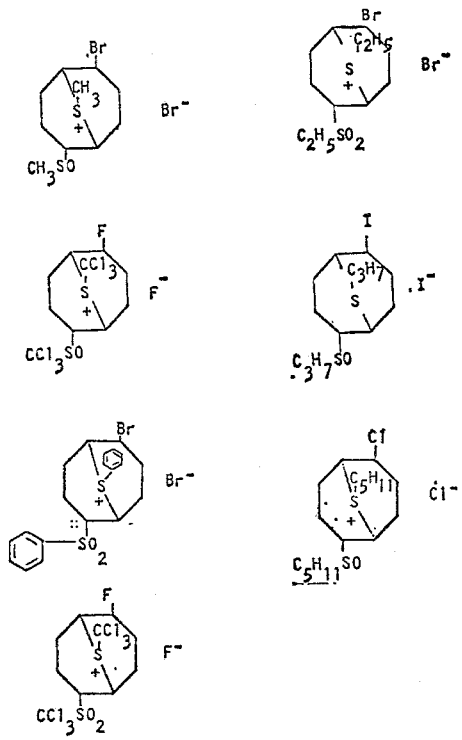

EXAMPLE 5

Effectiveness in destroying Mexican bean beetles and mites was established by applying the compound:

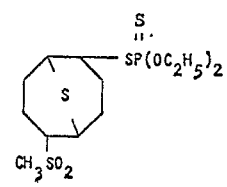

to about 50 to 100 adult mites and about 10 to about 25 Mexican bean beetles at various concentrations in water. The number of dead insects were counted. The results were as follows, after 24 hours.

|  |  |  |  |  | Control |
|---|---|---|---|---|---|
| Mexican bean beetle (percent mortality) | 100 | 100 | 100 | 100 | 0 |
| Mites (percent mortality) | 100 |  |  | 100 | 0 |
| Concentration, percent | 0.1 | 0.05 | 0.025 | .01 | 0 |

Similarly, the corresponding derivatives, tested in the same manner, yield substantially the same results. These derivatives include, among others,

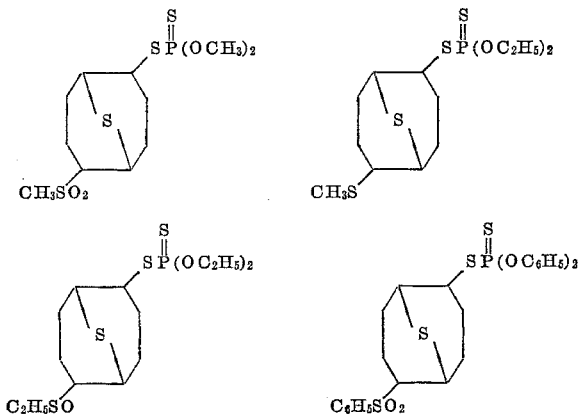

While there have been described various embodiments of the invention, the compositions and methods described are not intended to be understood as limiting the scope of the invention as it is realized that changes therein are possible, and it is further intended that each element recited in any of the following claims is intended to be understood as referring to all equivalent elements for accomplishing substantially the same results in substantially the same or equivalent manner, it being intended to cover the invention broadly in whatever form its principles may be utilized.

What is claimed is:

1. A compound of the formula:

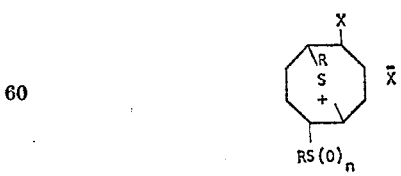

wherein: (a) X is halogen; (b) $n$ is from 0 to 2; (c) R is selected from the group consisting of (1) alkyl of 1 to 20 carbon atoms; (2) hydrocarbon aryl of 6 to 18 carbon atoms; (3) hydrocarbon aryl of 6 to 18 carbon atoms or alkyl of 1 to 30 carbon atoms substituted by up to 3 halogen atoms and (4) hydrocarbon aryl of 6 to 18 carbon atoms substituted by alkyl of 1 to 20 carbon atoms.

2. A compound in accordance with claim 1 wherein X is chlorine, R is an alkyl radical from 1 to 6 carbon atoms and $n$ is 0.

3. A compound in accordance with claim 2 wherein $n$ is 1.

4. A compound in accordance with claim 2 wherein $n$ is 2.

5. A compound of the formula:

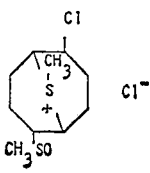

6. A compound of the formula:

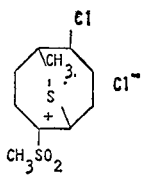

7. A compound of the formula:

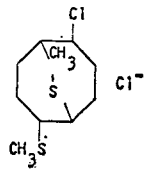

8. A process for the preparation of a compound of claim 1 wherein N=0 which comprises reacting a cyclooctadiene with a compound of the formula RSX at a temperature of from about —60 degrees centigrade to 60 degrees centrigrade.

9. A process for the preparation of a compound of claim 1 wherein $n=1-2$ and X is chlorine which comprises reacting a cyclooctadiene with a compound of the formula RSX at a temperature of from about —60 degrees centigrade to 60 degrees centigrades.

10. A process for the preparation of a compound of claim 1 wherein $n=1-2$ which comprises subjecting the corresponding sulfonium salt of the formula

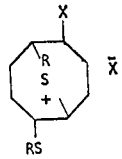

to from about 0.5 to about 5 moles of oxidizing agent per mole of sulfonium salt at a temperature of from about —25 degrees centrigrade to about 100 degrees centigrade, said oxidizing agent acting as a source of oxygen.

11. A process for the production of a compound of claim 1 wherein $n$ equals 1–2 and X is chlorine which comprises subjecting the corresponding sulfonium salt of the formula:

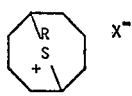

to from about 0.5 to about 5 moles of hydrogen peroxide per mole of sulfonium salt at a temperature of from about —25 degrees centigrade to about 100 degrees centigrade.

References Cited

UNITED STATES PATENTS 3,365,465   1/1968   Greenbaum _____ 260—327

JAMES A. PATTEN, Primary Examiner

U.S. Cl. X.R.

260—609, 999; 424—202, 275